N. J. BISHOP.
GATE.
APPLICATION FILED MAR. 7, 1922.
1,433,929. Patented Oct. 31, 1922.
2 SHEETS—SHEET 1.
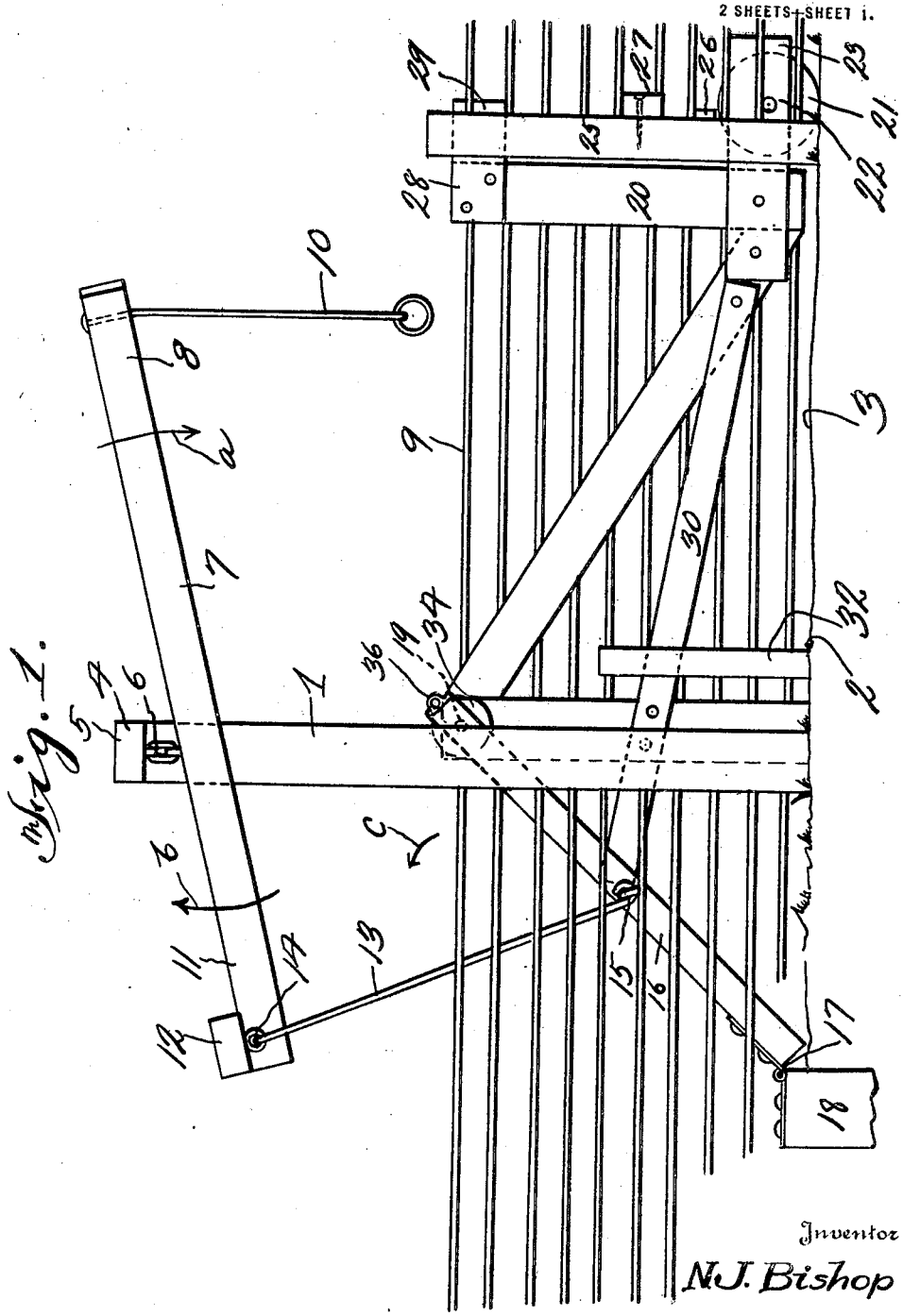
Inventor
N. J. Bishop
By
D. Swift
Attorney

N. J. BISHOP.
GATE.
APPLICATION FILED MAR. 7, 1922.

1,433,929.

Patented Oct. 31, 1922.
2 SHEETS—SHEET 2.

Inventor
N. J. Bishop

By D. Swift
Attorney

Patented Oct. 31, 1922.

1,433,929

UNITED STATES PATENT OFFICE.

NEWTON J. BISHOP, OF WASHINGTON, DISTRICT OF COLUMBIA.

GATE.

Application filed March 7, 1922. Serial No. 541,737.

*To all whom it may concern:*

Be it known that I, NEWTON J. BISHOP, a citizen of the United States, residing at Washington, in the District of Columbia, have invented a new and useful Gate; and I do hereby declare the following to be a full, clear, and exact description of the invention, such as will enable others skilled in the art to which it appertains to make and use the same.

The invention relates to longitudinally movable gates of the curvilinear type, and has for its object to provide a device of this character wherein the gate is moved rearwardly or forwardly by hinged bars pivotally connected to the upper rear corner of the gate, to which bars rockable diverging operating levers are connected by links.

A further object is to provide in combination with a curvilinear gate a supporting ground engaging wheel at its forward end, which ground engaging wheel supports the forward end of the gate during the longitudinal movement of the gate, thereby obviating the use of parallel pivoted gate operating bars, in a gate of this character.

A further object is to locate the supporting wheel forwardly of the free end of the gate between bevelled bars, which bars guide the gate between spaced gate posts, which gate posts are provided with a transversely disposed bar located over the wheel thereby preventing the forward end of the gate from being raised when closed, for instance by animals, such for instance as hogs rooting under the gate.

A further object is to entirely conceal the pivotal pin of the operating bars, thereby eliminating bolts and nuts and to secure the various parts adjacent the pivotal point of the gate permanently together without the use of nuts and bolts.

With the above and other objects in view the invention resides in the combination and arrangement of parts as hereinafter set forth, shown in the drawings, described and claimed, it being understood that changes in the precise embodiment may be made within the scope of what is claimed without departing from the spirit of the invention.

In the drawings:—

Figure 1 is a side elevation of the gate.

Figure 2 is a top plan view of the gate, one of the operating levers being broken away.

Figure 3 is a detail sectional view transversely through the pivoted corner of the gate.

Referring to the drawings the numeral 1 designates spaced vertically disposed parallel posts located adjacent the side 2 of the roadway 3. The upper ends of the posts 1 are connected together and braced by a bar 4, the ends 5 of which extend beyond the outer sides of the posts 1 and have pivotally connected thereto at 6 diverging operating bars 7. The ends 8 of the bars 7 overlie the road bed 3 at each side of the gate 9 and are adapted to be rocked downwardly in the direction of the arrow *a* in Figure 1 by the driver of an approaching vehicle pulling downwardly on the ropes 10, thereby causing the ends 11 of the operating bars 7, which are connected together by the transversely disposed bar 12, to simultaneously move upwardly in the direction of the arrow *b*, and impart an upward pull on the connecting rods 13, which are pivotally connected at 14 to the under side of the bar 12 and have their lower ends pivotally connected at 15 to spaced hinged bars 16, which bars are hingedly connected at 17 to posts 18. It will be seen that when a vigorous pull is imparted on either of the ropes 10, that the connecting bars will cause the hinged bars 16 to move in the direction of the arrow *c* and in a vertical plane. During this action, the gate which is pivoted on the concealed shaft 19 will move rearwardly until its rear end rests on the ground spaced from the roadway and after the pivoted members 16 have passed through and beyond a line drawn between the pivotal points 14 and 17. As the spaced hinged bars have passed beyond an aligned position with the pivotal points 14 and 17, it will be seen that the weight of the gate will cause the completion of the movement of the gate to open position. The closing of the gate is substantially a reverse operation to that set forth above.

During the longitudinal movement of the gate in both directions the forward end 20 of the gate is supported spaced from the roadway by means of the supporting wheel 21, which wheel is pivotally mounted between guide bars 22 having bevelled ends 23, therefore it will be seen that no matter what the contour of the roadway may be, the wheel will positively support the gate under all conditions and mud or the like will not interfere with the operation of the gate. By providing the bevelled end 23 on the bars 22, it will be seen that during the longitudinal movement of the gate that if it does not run true the bevelled ends 23 will engage the curved edges 24 of the gate posts 25 and will be guided into position between the gate posts 25 where the supporting wheel 21 will be disposed under the transversely disposed bar 26 carried by the gate posts 25 in such a manner that if an animal should try to raise the end 20 of the gate the wheel will engage the bar 26 and prevent the free end of the gate from being raised. The spaced posts 25 are connected together by a bar 27 which braces the posts in relation to each other and prevents spreading. The free end of the gate adjacent its upper end is provided with spaced guiding members 28 which have bevelled ends 29 for cooperating with the curved edges 24 of the posts 25 in the same manner as the bevelled end 23 of the members 20.

Secured to the opposite sides of the gate 9 and extending preferably rearwardly and upwardly are guide bars 30, the rear ends of which bars are bevelled as shown at 31 to insure the proper guiding of the gate 9 between the hinged bars 16 during a gate opening operation. However the gate may be further guided in its longitudinal movement by the guide posts 32 located to each side of the gate and sligthly spaced from the bars 30. It will be seen that the gate will be positively guided in its movement in both directions and that the spaced gate posts 25 will prevent side movement of the free end of the gate and that the raising of the free end of the gate when the gate is closed, will be prevented. The shaft 19 has its ends rotatably mounted in bearings of sockets 33 imbedded in the inner faces of the hinged members 16, there being spacing washers 34 interposed between the sides of the gate 9 and the inner faces of the hinged members 16, and prevent transverse movement of the gate 9. The upper ends of the hinged members 16 are held together by means of a rivet 35, which passes through ears 36 of plates 37, which plates are secured to upper ends of the hinged members 16. It will be seen that the rivet 35 will prevent outward displacement of the hinged members 16 and consequently maintain the ends of the shaft 19 in the socket 33. By so constructing the device, it will be seen that the use of bolts and nuts which loosen incident to constant use of the gate are eliminated. It will also be seen that the gate is positive in its operation and may be easily and quickly operated from either side and without the necessity of the operator leaving the vehicle to manipulate the gate.

The invention having been set forth what is claimed as new and useful is:—

1. The combination with a longitudinal movable gate of the curvilinear type, operating mechanism for moving said gate, vertically disposed guide members for guiding said gate in its longitudinal movement, spaced posts adjacent the free end of the gate, an outwardly extending member carried by the free end of the gate and provided with means for engaging the posts and guiding the gate, a supporting wheel carried by said outwardly extending member and means carried by the posts and located above the wheel for preventing upward movement of the free end of the gate.

2. The combination with the free end of a curvilinear gate, of forwardly extending arms carried by the free end of said gate, the outer ends of said arms being provided with bevelled surfaces, spaced holding and guiding posts located on each side of said arms, a supporting wheel for the free end of the gate, said wheel being pivotally mounted between the forwardly extending arms, means carried by the guiding posts and located above the forwardly extending arms and forming means for preventing upward movement of the free end of the gate.

3. The combination with a curvilinear gate moved to open position by inclined spaced hinged members, said members being pivotally connected to the gate adjacent its upper rear corner, of guide bars carried by the opposite sides of the gate and extending rearwardly beyond the end of the gate, said guide bars terminating in bevelled surfaces and forming means for guiding and preventing transverse movement of the gate during its rearward movement.

4. The combination with a longitudinally movable gate operated by spaced hinged members, of connecting means between said spaced hinged members and the gate, said connecting means comprising a horizontally disposed shaft having its ends extending into the inner sides of the hinged members, eyes carried by the hinged members and securing means connecting said eyes together and forming means for preventing spreading of the hinged members.

5. The combination with a longitudinally movable gate, operated by spaced hinged members, of connecting means between said spaced hinged members and the gate, said connecting means comprising a horizontally disposed shaft, the ends of said horizontally disposed shaft extending into the inner faces of the hinged members, spacing members carried by the shaft on each side of the gate, eyes carried by the hinged members and a member connecting said eyes together, thereby preventing spreading of the hinged members and displacement of the ends of the shaft.

In testimony whereof I have signed my name to this specification in the presence of two subscribing witnesses.

NEWTON J. BISHOP.

Witnesses:
W. M. HOFFMAN,
PHILIP A. H. TERRELL.